Dec. 27, 1955        D. J. MARSHALL        2,728,383
TIRE BEAD LOOSENING TOOL OR BEAD BREAKING DEVICE
Filed April 13, 1953        2 Sheets-Sheet 1
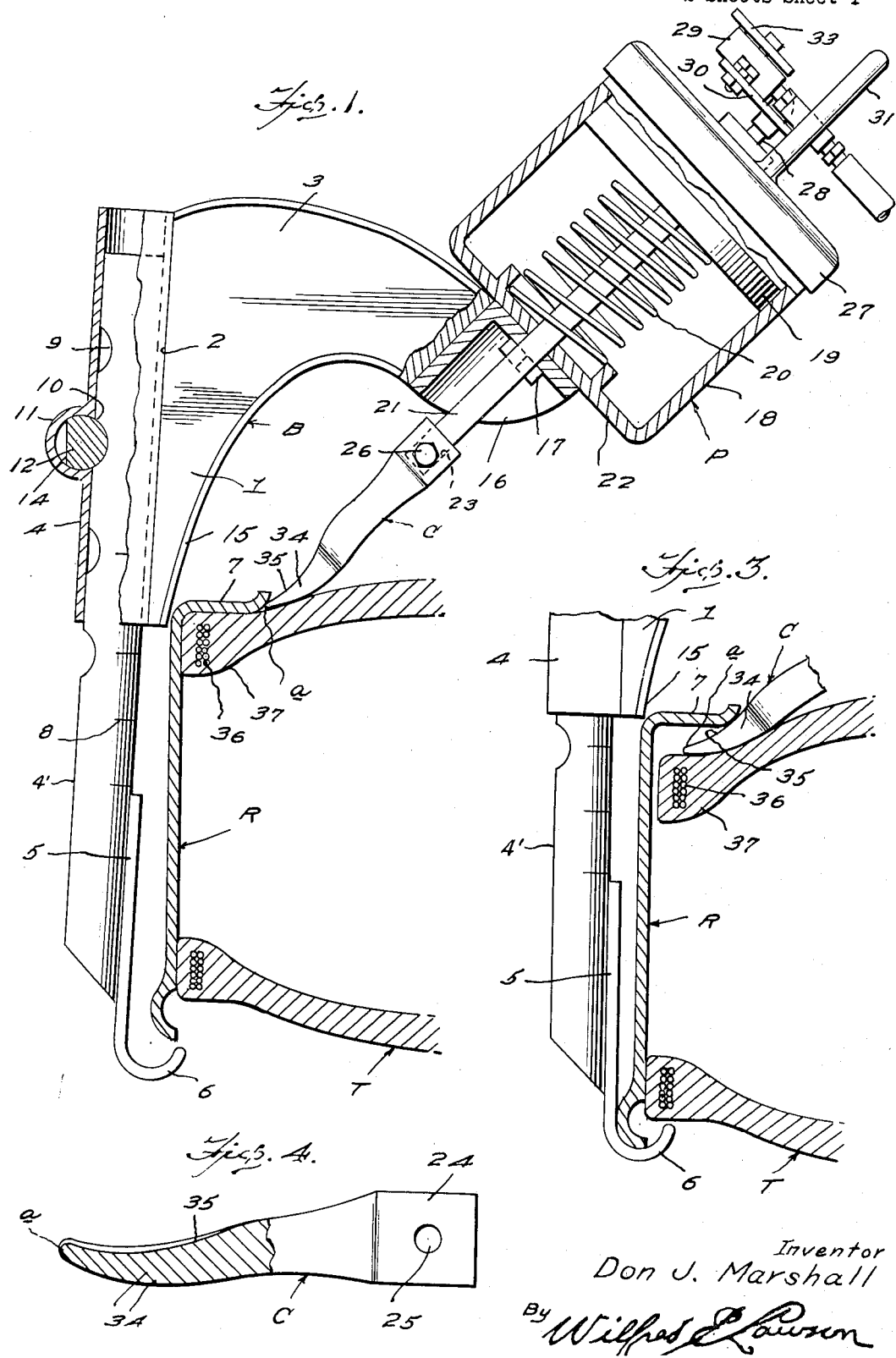
Inventor
Don J. Marshall
By Wilfred Lawson Dec. 27, 1955   D. J. MARSHALL   2,728,383
TIRE BEAD LOOSENING TOOL OR BEAD BREAKING DEVICE
Filed April 13, 1953   2 Sheets-Sheet 2
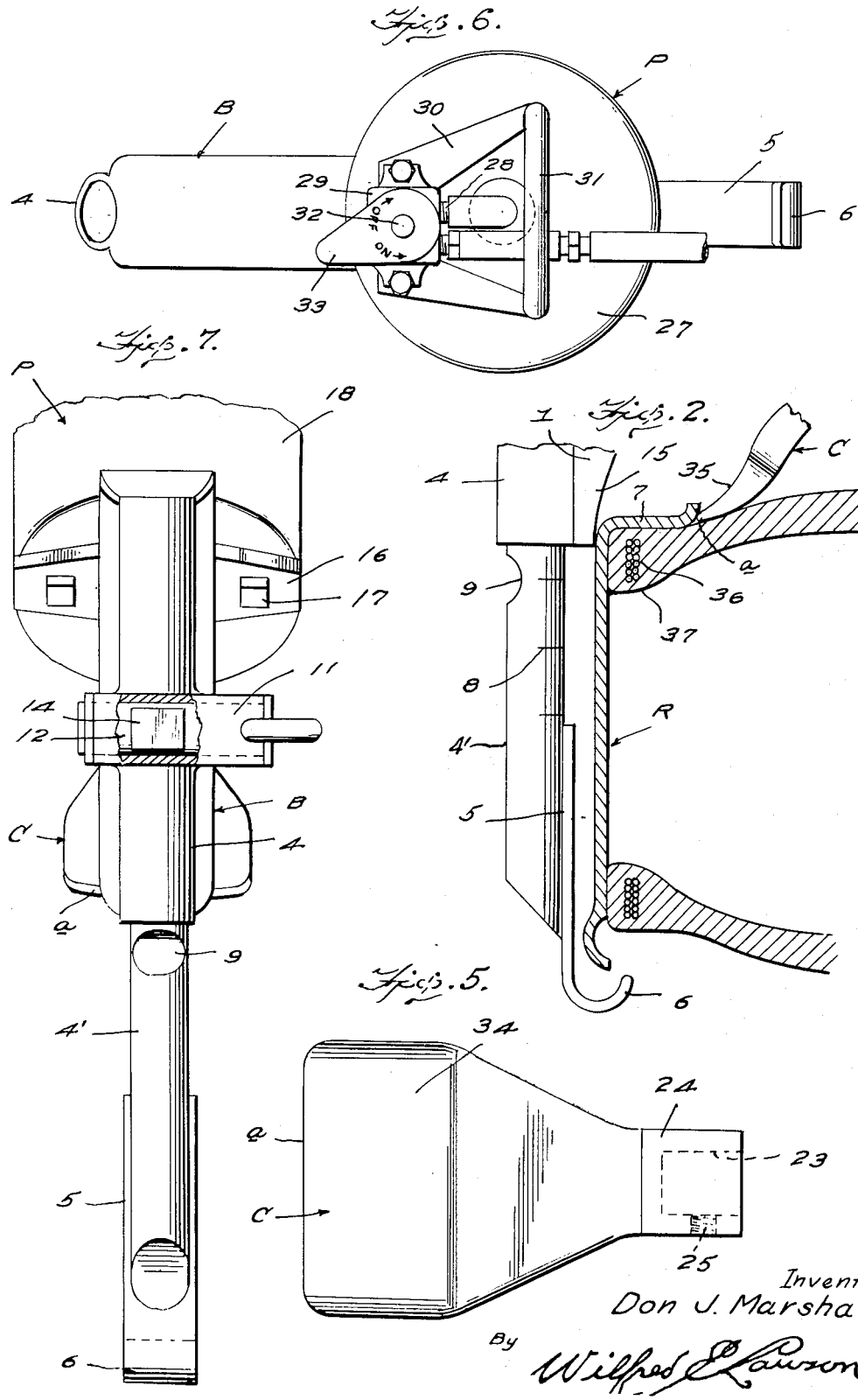
Inventor
Don J. Marshall
By Wilfred E. Lawson United States Patent Office 2,728,383
Patented Dec. 27, 1955

2,728,383

TIRE BEAD LOOSENING TOOL OR BEAD BREAKING DEVICE

Don J. Marshall, Baltimore, Md., assignor to Marshall H. Wentz, Baltimore, Md.

Application April 13, 1953, Serial No. 348,219

1 Claim. (Cl. 157—1.26)

This invention relates to a tire bead loosening tool or bead breaking device and it is an object of the invention to provide a tool or device of this kind which readily adapts itself for use with a minimum of manual effort and labor to the removal of tires from tire rims of the continuous type.

Furthermore, it is an object of the invention to provide a tool or device which is portable and which provides a safe effective means for the rapid loosening of tires, and more especially heavy duty truck tires, when bounded by corrosion to the tire rim.

A still further object of the invention is to provide a tool or device for loosening a tire upon a rim which locks itself to the rim and at the termination of the bead breaking or loosening automatically unlocks itself with no adjustment, hammering or other expenditure of effort on the part of the operator.

It is also an object of the invention to provide a tool or device wherein a locking action between the tool or device and the wheel rim is effected by the natural reaction to thrust and which forces the locking action at all times to be equal to the operating thrust being used, thereby substantially eliminating liability of slippage which could result in serious injury to the operator.

A still further object of the invention is to provide a tool or device of this kind including a chisel to be driven between the tire bead and the flange of the wheel rim in such a way as to direct the energy with greatest effectiveness at the location where the actual corrosive or rust bond exists between the opposed surfaces of the tire bead and the wheel rim flange.

The invention has a still further object to provide a tool or device including a chisel wherein the travel of the chisel during a working operation is substantially parallel to the natural line of cleavage between the tire and rim flange to permit the chisel to cleave without unduly distorting or stressing the fabric side wall of the tire.

A purpose of the invention is to provide a tool or device of this kind including a chisel to be forced between the tire bead and flange of the tire rim and wherein a face of the chisel at the entering end portion thereof is formed to provide a cam surface to work against the rim flange after the point or toe of the chisel is in engagement with the usual rim forced portion of the tire bead so that the tire side wall is relieved of damaging stress.

The invention consists in the details of construction and in the combination and arrangement of novel parts of the improved bead loosening tool or bead breaking device whereby certain important advantages are attained as will be hereinafter more fully set forth.

In order that the invention may be better understood, the same will now be described with reference to the accompanying drawings, wherein:

Figure 1 is a view in side elevation, with parts in section of a tool or device constructed in accordance with an embodiment of the invention and illustrating the initial application of the tool or device to the tire rim;

Figure 2 is a fragmentary view partly in elevation and partly in section illustrating a second position of the tool or device with respect to the tire rim;

Figure 3 is a fragmentary view partly in elevation and partly in section showing the tool or device locked to the rim and a side wall of the tire separated from the flange of the tire rim;

Figure 4 is a view partly in side elevation and partly in section of the chisel as herein comprised unapplied;

Figure 5 is a view in top plan of the chisel illustrated in Figure 4;

Figure 6 is a view in top plan of the tool or device as illustrated in Figure 1, with tire and rim omitted, and the tool or device swung to the left to bring the power unit into a vertical position;

Figure 7 is a view of front elevation of the tool or device with a portion broken away, the tire and rim being omitted.

In the embodiment of the invention as illustrated in the accompanying drawings, B denotes a body of desired dimensions and of such material as may be preferred. This body B includes a front portion 1 the outer face 2 of which is straight from end to end. Extending laterally from one extremity of the portion 1 and in a direction away from the outer straight face 2, is a relatively heavy arm 3 disposed on a downward or inward incline and of a length such that its outer or free end portion terminates inwardly of the adjacent end of the portion 1.

Welded to or otherwise rigid with the straight face 2 of the portion 1 of the body B and coextensive in length with said face 2, is a barrel 4, open at both ends. Snugly and telescopically engaging within said barrel 4, is a rod 4' of a length to have one end portion extending at all times beyond the end of the barrel 4 remote from the arm 3. The outer or extended portion of the rod 4' has rigid therewith, as by welding, an elongated narrow plate 5 extending along the bar 4' and terminating beyond the outer end of the bar 4'. The outer end of the bar 4' is continued by an inwardly disposed hook 6 to engage the tire rim R at the side thereof remote from the fixed or integral rim flange 7. The bar 4' is to be extended in accordance with the width of the rim R and to readily determine such extension the bar 4' is provided at points spaced therealong with the index lines 8.

The bar 4' is provided therealong with the longitudinally spaced notches 9 substantially part-circular in cross section and which selectively register with an opening 10 in the wall of the barrel 4. This opening 10 is in communication with a transversely disposed sleeve 11 rigid with the barrel 4. Snugly and rotatably fitted within the sleeve 11 is locking pin 12 of a diameter, when the pin is in one adjustment to extend through the opening 10 of the barrel 4 into a registering notch or recess 9 and thereby hold the bar 4' in selected endwise adjustment. The pin 12 in a position co-planar with the opening 10 is provided with a chordal flat face 14, which, upon a one-half turn of the pin 12 from locking position faces the opening 10 but is confined in the sleeve 11 to allow desired endwise movement of the bar 4' where an adjustment is desired.

The inner edges of the arm 3 and the adjacent part of the portion 1 of the body B are disposed on desired curvatures to particularly provide on the inner edge of the portion 1, a wedge-like cam surface which, in the initial application of the tool or device to the rim R has contact with the flange side of the rim as will hereinafter be more particularly referred to.

The outer end of the arm 3 of the body B has rigid therewith a bracket 16 on which is firmly held by bolts 17, or otherwise, the cylinder 18 of a power unit P herein set forth as of a pneumatic type although the invention is not to be limited in this respect.

Working in this cylinder 18 is a piston 19 constantly urged toward its retracted position by a coil spring 20 of required tension surrounding the piston rod 21 of the piston 20 and interposed between said piston 20 and inner head 22 of the cylinder 18. This piston rod 21 is of a length to extend at all times through and beyond the inner head 22 of the cylinder 18 and is also freely disposed through that portion of the bracket 16 upon which the cylinder 18 is mounted.

The outer extremity of the piston rod 21 is snugly received within a socket 23 provided in the outer end portion of the shank 24 of the chisel C. A wall of the socket 23 is provided with an opening 25 which threadedly receives a set screw 26 for holding engagement with the outer end portion of the piston rod 21 within the socket 23.

In communication with the cylinder 18 through the outer head 27 thereof is a conduit 28 having interposed therein a valve mechanism 29, said mechanism, in the present embodiment of the invention, being mounted on a bracket 30 extending laterally from and rigid with a hand hold 31 carried by the head 27 and extending in a direction substantially at right angles to the arm 3 of the body B. As herein disclosed the hand hold 31 is eccentric to the axial center of the head 27 and at the side thereof remote from the arm 3.

The valve mechanism 29 may be as desired but as herein comprised is of a rotary type wherein the rotary valve member 32 is manually adjusted into "on" or "off" position by the lever 33.

The chisel C is of material width with its outer or entering edge *a* straight and perpendicular to the longitudinal center line of the chisel C. The toe 34 is wedge like and disposed on a predetermined curvature in a direction lengthwise of the chisel with the upper surface of the toe 34 formed to provide a cam 35 at a point inwardly of the entering edge *a* substantially equal to the distance from the usual reinforcement 36 of a tire bead 37 when the tire is applied to the rim R.

The tool or device as herein comprised is light in weight and is readily portable, being easily handled by an operator grasping the hand hold 31, which is preferably of a loop type.

In practice rim R and applied tire T is preferably supported in a horizontal position with the rim 7 uppermost. The rod 4' is extended in accordance with the width of the rim R and to an extent that the inwardly facing hook 6 will be slightly below the rim R when the outer portion of the cam edge 15 of the body B of the tool or device is rested upon the upper margin of the rim R (Figure 1). In this initial position the rod 4' is disposed on a slight outward and downward divergence or angularity with respect to the rim R. The power unit P is then operated to cause outward movement of the chisel C and as the same contacts the outer margin of the rim R, the body B will pivot with respect to the rim R and swing the rod 4' inwardly to cause the hook 6 to underlie the lower margin of the rim R (Figure 2). At substantially the end of this action, the chisel C will start entering between the rim R and the tire T and the wedge formation of the toe 34 of the chisel C will effect an upward lift of the tool or device and bring the hook 6 into effective holding engagement with the under marginal portion of the rim R. This holding engagement will be maintained throughout the period the chisel C is in effective position between the flange 7 and the tire T. About the time the entering edge 34 of the chisel C reaches the reinforcement 36 of the bead 37, the high portion of the cam surface 34 of the chisel C effects the required pressure on the side wall of the tire T to release or break any rust or corrosion bond between the bead 37 and the flange 7. Upon release of the pressure, preferably air, within with the cylinder 18, the spring 20 will retract the rod 21 and withdraw the chisel C from between the flange 7 and the tire T so that the tool or device may be removed.

It is to be pointed out that the holding action of the hook 6 on the rim R by means of the reaction to the thrust imposed upon the chisel C assures such holding action at all times to be equal to the operating thrust being used. This substantially assures freedom from danger of any slippage which, otherwise, could result in serious injury to the operator.

Due to the angularity of the thrust line of the tool or device in relation to the rim R and tire T assembly, the travel of the entrance edge 34 of the chisel is roughly parallel to the natural line of cleavage between the side wall of the tire R and the rim flange 7 thus allowing the chisel C to cleave between the side of the tire T and the rim R without unduly distorting or stressing the tire side wall.

The positive downward breaking thrust is effected by the cam surface 35 of the chisel C working against the flange 7 after the entering edge *a* of the chisel C is in contact with the reinforced portion of the bead 37 of the tire T. The operation not only prevents undue stress the side wall of the tire T but creates a direct mechanical connection between the power unit P and the rust or corrosion. This is in contrast to the general practice of delivering the thrust through the fragile and resilient sidewall fabric of the tire T.

It is also believed to be apparent that the tool or device as herein comprised locks itself to the rim R and unlocks itself therefrom at the end of a bead breaking or forcing operation without adjustment, hammering or other expenditure of effort or time on the part of the operator. It has been established in actual practice, that with the use of a tool or device as herein embodied, a complete cycle of operation can be had within six to ten seconds, reducing the time for removal of a heavy duty tire to approximately five minutes instead of a period of twenty minutes as is now generally necessary.

I claim:

A portable power operated tool for breaking the bond between a tire rim and the bead of a tire mounted thereon, said tire rim having a bead engaging flange on one edge, said tool comprising a body having an elongated barrel at one end, a rod slidably received in said barrel, a hook on one end of said rod, means for locking said rod in said barrel with said hook disposed a predetermined distance from said body, a fluid pressure cylinder mounted on said body, a piston in said cylinder, a piston rod projecting from said cylinder toward said rod at an angle thereto and a chisel of generally wedge formation fixed to the end of said piston rod whereby with said rod disposed within said tire rim and substantially parallel to the inner surface of said rim and with said hook engaging over the edge of said rim opposite said flange, the said angle of said piston rod with respect to said rod is such that the path of movement of said chisel is substantially parallel to the line of cleavage between said bead and said flange, whereby upon movement of said chisel between said bead and said flange under the action of fluid pressure said bond will be broken solely by the wedging action of said chisel with the force being applied substantially entirely to said bead inwardly of the side wall of the tire, continued movement of said chisel after breaking said bond serving to move said tire axially of said rim to facilitate removal of said tire from said rim.

References Cited in the file of this patent

UNITED STATES PATENTS

| 1,567,276 | Kowalzcyk et al. | Dec. 29, 1925 |
|---|---|---|
| 1,591,193 | Weaver | July 6, 1926 |
| 2,367,638 | McCulloch | Jan. 16, 1945 |
| 2,455,580 | Hewitt | Dec. 7, 1948 |
| 2,495,117 | McCollister | Jan. 17, 1950 |
| 2,520,330 | Northrup et al. | Aug. 29, 1950 |
| 2,606,602 | Manupello | Aug. 12, 1952 |
| 2,621,715 | Lien et al. | Dec. 16, 1952 |
| 2,667,212 | Zaffina | Jan. 26, 1954 |
| 2,684,710 | Calvin | July 27, 1954 |

FOREIGN PATENTS

| 698,887 | Great Britain | Oct. 28, 1953 |
|---|---|---|